United States Patent Office 3,733,388
Patented May 15, 1973

3,733,388
PURIFICATION PROCESS FOR SOLUTIONS CONTAINING RHENIUM
Max Ziegler, Hohe Linde, Germany, assignor to W. C. Heraeus G.m.b.H., Hanau (Main), Germany
No Drawing. Filed Apr. 27, 1971, Ser. No. 137,951
Claims priority, application Germany, May 2, 1970,
P 20 21 631.3
Int. Cl. C01g 47/00
U.S. Cl. 423—49       2 Claims

ABSTRACT OF THE DISCLOSURE

Metal impurities are quantitatively removed from aqueous rhenium solution or an ammonium perrhenate solution with an ion exchange material comprising a support to which is bound polyethyleneimine as the active exchange material.

BACKGROUND

The present invention relates to a process for the complete purification of aqueous solutions containing rhenium from any metal impurities that may be in the solution, such as an especially, molybdenum, tungsten and/or vanadium.

Rhenium always occurs in nature in only very low concentrations (less than 0.001%). Molybdenite is relatively rich in rhenium. The occurrence and the chemical properties of rhenium indicate that it is chemically very close to molybdenum, and for this reason it is concentrated with the molybdenum in the processing of molybdenum ores, and it can be extracted from the molybdenum concentrates.

U.S. Pat. No. 2,876,065 teaches to first subject a rhenium solution containing impurities to a preliminary clarification and then put the solution into intimate contact with a suitable anion exchanger material, such as as strongly basic synthetic resin of the alkylamine type. In this procedure, molybdenum and other impurities of low concentration, such as arsenic and selenium *and* rhenium are recovered by the ion exchanger; then the molybdenum and other impurities are removed by appropriate alkaline eluting methods, and finally the rhenium is eluted with a dilute solution of a strong mineral acid. Optimum results in this process are dependent on the use of the preferred perchloric acid for the elution of the rhenium, and this greatly limits the materials that can be used for the apparatus used in the process, since they must be resistant both to strong bases and to strong acids. Furthermore, perchloric acid is expensive, makes the system somewhat hazardous, and it is consumed in this process, which necessitates a great number of steps.

It has also been proposed, according to German Pat. 1,808,707, to elute the rhenium from the ion exchanger material with an aqueous thiocyanate solution, which makes the use of the strongly acid perchloric acid unnecessary. However, it is to be noted that not only must thiocyanates having an appreciable solubility in water be used, but also their solubility in water must be greater than that of the corresponding perrhenates when both salts are in solution. Furthermore, solutions which have a less than 0.1× molar concentration are generally inadvisable on account of the excessive amount of water per gram of rhenium, which is then present in the crystallization stage if a solution that is diluted to this extent is used. Nevertheless, there are also upper limits on the concentration, which are imposed by the solubility limits of the perrhenates.

SUMMARY

It is an object of the present invention to provide a simple, gentle and economical process for the quantitative purification of aqueous solutions containing rhenium in addition to other metals, preferably molybdenum, tungsten and/or vanadium, to remove the metals contained in this solution.

This object is achieved by the invention in that an alkali metal solution or ammonium perrhenate solution is brought into contact with an ion exchanger support material to which polyethyleneimine is bound as the active ion exchange material.

DESCRIPTION

For the purification of rhenium in accordance with the invention, acid or alkaline solutions, which may contain higher concentrations of tungsten, molybdenum or vanadium, are brought to a pH value between 6 and 7.5, i.e., approximately neutralized. If such solutions are then passed through an ion exchanger containing bound polyethyleneimine, metals such as molybdenum, tungsten and/or vanadium are quantitatively adsorbed, while the rhenium remains entirely in solution and, after the ion exchanger is flushed out with water, will have passed in its entirety through the separating column. This is proven by the following experimental findings.

|   | Grams of rhenium per liter put in | Grams of rhenium found in output | Ratio, Re:Mo:W:V in the solution |
|---|---|---|---|
| 1 | 0.001 | 0.000992 | 1:100:100:100 |
| 2 | 0.001 | 0.000996 | 1:5,000:1,000:100 |
| 3 | 0.0005 | 0.000505 | 1:5,000:1,000:1,000 |
| 4 | 0.0005 | 0.00049 | 1:5,000:5,000:5,000 |
| 5 | 0.00025 | 0.000245 | 1:5,000:2,000:2,000 |
| 6 | 0.00025 | 0.000240 | 1:5,000:5,000:5,000 |
| 7 | 0.00010 | 0.0000985 | 1:2,500:2,500:2,500 |

Concentrated solutions containing rhenium can, according to the invention, be freed from even minute quantities of impurities on an ion exchanger containing bound polyethyleneimine, as is shown by the following table:

|   | Grams Mo per liter of input | Grams Mo found | Rhenium content in grams per liter |
|---|---|---|---|
| 1 | 0.00025 | 0.000247 | 2.0 |
| 2 | 0.00025 | 0.00025 | 4.5 |
| 3 | 0.00010 | 0.00010 | 11.0 |
| 4 | 0.00010 | 0.00005 | 20.0 |

An additional example will illustrate the selectivity and the quantitative adsorptivity of the ion exchanger containing polyethyleneimine bound to it, when the quantities of molybdenum present as an impurity are very small and the rhenium concentration is high:

A virtually neutral solution containing 50 grams per liter of ammonium perrhenate and 0.00001 g. of molybdenum as molybdate is run through a column of polyethyleneimine cellulose. After the column has been washed with water, it is treated with 0.01 to 1× normal soda lye or potash lye. The determination of the molybdenum in the eluate shows that the entire amount of molybdenum that was present in the input is in the eluate, i.e., that it had previously been quantitatively adsorbed into the column composed of polyethyleneimine cellulose.

This example shows that even minute quantities of impurities are completely removed from the solution containing rhenium, in a very simple manner.

Similarly performed experiments in the selective adsorption of tungsten (as tungstate) and of vanadium (as vanadate) have led to the same results.

Polyethyleneimine cellulose which is substantially free of unbound polyethyleneimine has proven best in practice.

What is claimed is:

1. Process for the quantitative removal of metal impurities selected from the group of molybdenum, tungsten and vanadium from aqueous solutions containing said impurities and alkali metal-rhenium or ammonium perrhenate which comprises adjusting the pH of said aqueous solutions to between 6 and 7.5 and thereafter contacting same with an ion exchange material comprising a cellulose support having bound thereto polyethyleneimine as the active exchange material whereby said impurities are quantitatively adsorbed while the rhenium remains entirely in solution.

2. Process of claim 1 wherein said aqueous solutions are passed through a separating column containing said ion exchange material.

References Cited

UNITED STATES PATENTS

| 2,876,065 | 3/1959 | Zimmerley et al. | 23—15 W |
| 2,945,743 | 7/1960 | Zimmerley et al. | 23—15 W |
| 3,558,268 | 1/1971 | Prater et al. | 23—15 W |
| 3,533,725 | 10/1970 | Bridgeford | 75—101 BE |
| 3,553,306 | 1/1971 | Church | 75—101 BE |
| 3,573,277 | 3/1971 | Grant | 75—101 BE |

OTHER REFERENCES

Randerath: Angew. Chem. International Edition," vol. 1, 1962, p. 553.

HERBERT T. CARTER, Primary Examiner

U.S. Cl. X.R.

423—54, 63; 75—101 BE